May 22, 1928.
H. H. SCHUETTE
FENCE PROTECTOR
Filed April 27, 1927
1,670,869
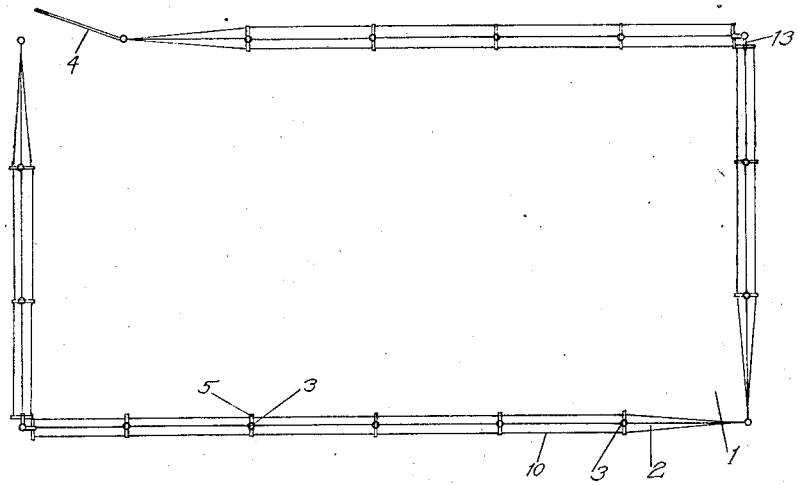
Fig 1
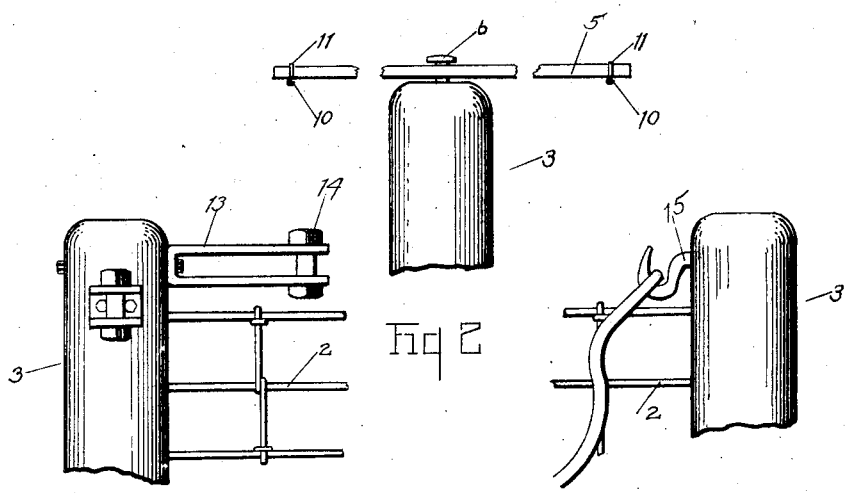
Fig 2
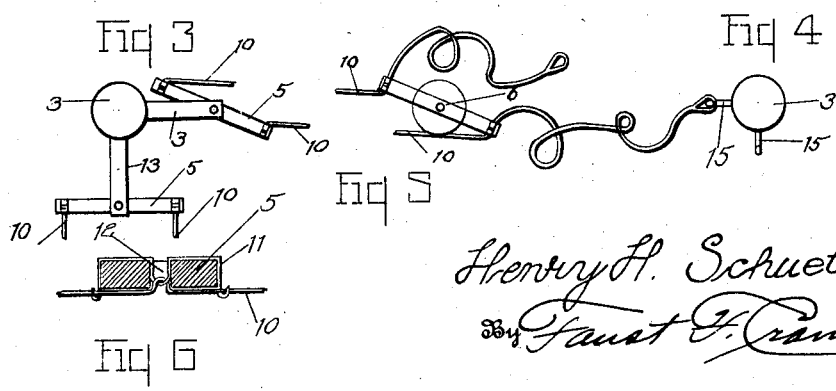
Fig 3  Fig 4
Fig 5
Fig 6
Inventor
Henry H. Schuette,
By Faust F. Crampton.
Attorney Patented May 22, 1928.

1,670,869

UNITED STATES PATENT OFFICE.

HENRY H. SCHUETTE, OF NAPOLEON, OHIO.

FENCE PROTECTOR.

Application filed April 27, 1927. Serial No. 186,995.

My invention has for its object to provide a means for preventing horses and cattle and trespassers from breaking down or stretching the top of wire fences which commonly occurs where horses reach over the top of wire fences to browse in fields adjoining to which they are allotted and which often occurs when boys climb over fences. At first the top wire is bent down and stretched and finally the lower wires are stretched until the fence does not efficiently enclose or separate fields. By my invention the fence is protected by wires that extend parallel to the fence and are located at the top and along lines that are displaced a distance from the top wire of the fence sufficiently to prevent material engagement with the top wire when an effort is made to reach over or climb over the top of the fence. The parallel wires thus operate to protect the fence and prevent the upper part thereof from being stretched down toward the ground.

The invention particularly provides for so supporting the parallel wires that they may be readily moved close to the fence when it is desired to operate upon the ground, such as, plowing, cultivating or harvesting in the field having a fence that is protected by my invention. Thus when it is desired to manipulate the ground the projecting wires may be folded close to the fence so that the operations will not be interfered with.

The invention may be contained in protective fence structures of different forms and to illustrate a practical application of the invention, I have selected a means for supporting the wires that embodies the invention and which is illustrative of the various structures in which the invention may be utilized. The particular structure selected is shown in the accompanying drawing and is described hereinafter.

Fig. 1 illustrates a field having fences that are protected by the construction selected as an example of the embodiment of my invention. Fig. 2 is a side view of the top of the post of one of the fences of the field. Fig. 3 is a side view of one of the corner posts. Fig. 4 is a side view of another corner post. Fig. 5 illustrates two end posts of a fence. Fig. 6 illustrates a means for connecting the protective wires to the cross bar which is so supported as to dispose the protective wires at a point more or less removed from the top wire of the fence.

The field 1, indicated in Fig. 1, is separated from surrounding areas by the fence 2, which is supported by means of the posts 3. At 4 is indicated a gate through which the field may be entered. The posts of the field are provided with pivoted cross bars 5. The cross bars 5 are supported in their pivotal relation to the post by any satisfactory means. In the form of construction shown, and where wooden posts are used, a spike may be driven through an opening formed in the cross bar 5, and into the top of the post. Where the post is formed of metal a suitable pin may be secured by wire or other means to the top of the post. If the post is formed of concrete a central reinforcing bar may extend through the top of the concrete in order that its associated cross bar may be pivotally supported.

The ends of the cross bars 5 are connected to the protective wires 10. The protective wires 10 may be connected to the ends of the cross bars 5 in any suitable manner. In Fig. 6 is shown a short wire 11 that may be inserted through an opening 12 so as to crimp the associated wires 10 into the opening 12 and draw the crimped portion in the opening 12. The ends of the wire 11 may then be hooked over the wire 10 so as to effectively lock the wire 10 to the end of the cross bar 5. At one end post of the fence, or the corner post of the field, the cross bar 5 is supported in a bracket 13 that may be bolted to the corner post or may otherwise be secured as by wiring. The bracket 13 may be made U-shaped and a bolt 14 may be inserted through the ends of the bracket and the cross bar 5 and so as to pivotally connect its cross bar to the post. The ends of the wires 10 are connected to the cross bar 5 pivotally supported by the end post or corner field post 3. The other end post of the fence is, preferably, provided with a hook 15 and the wires 10 are looped and the eyes are placed on the hook 15. When the wires are stretched all of the cross bars 5 extend substantially at right angles to the plane of the fence and, consequently, the wires 10 are located at their most remote position relative to the posts of the fence. Thus the protective wires 10 protect the top of the fence from being broken down since they hold the stock back from contact with the fence and also they form a considerable hindrance to one who attempts to climb over the fence. When, however, it is desired to plow the field, or otherwise manipulate the ground, or harvest the vegetation, one of the wires may be unhooked or released from the hook 15 and the elasticity, or the weight of the other wire, will draw the ends of the cross bars, to which it is connected, towards the post having the hook 15 which will swing the wires 10 close to or against the posts and thus position the wires close to the fence and so that they will not interfere with the operations of the agriculturist. If desired the posts having the hooks 15, to which the ends of the wires are connected, may be located in opposite corners and the posts having the brackets 13 may likewise be located in opposite corners substantially as shown in Fig. 1. Thus when the farmer enters the field, he may readily release certain of the wires and draw the other wire so as to rotate the cross bars 5 and place them close to the plane of the fence.

I claim:

1. In a fence protector, the fence having a plurality of spaced posts, a plurality of bars pivotally supported on the tops of the fence posts, a pair of wires disposed one on each side of the fence and connected to the ends of the bars and so as to locate the bars substantially parallel to each other, means for removably securing the ends of the wires, whereby the wires may be moved in juxtaposed relation with respect to the top of the fence when the bars are rotated.

2. In a fence protector, the fence having a plurality of spaced posts, a plurality of bars pivotally supported on the tops of the fence posts, a pair of wires disposed one on each side of the fence and connected to the ends of the bars and so as to locate the bars substantially parallel to each other, a bracket for pivotally supporting one of the bars on the end post of the fence, a hook for securing the wires at the other end of the fence to the end post whereby the wires when secured to the hook will be located remote from the upper edge of the fence and may be moved into juxtaposed relation with respect to the upper edge of the fence when one of the wires is disconnected from the said hook.

In witness whereof I have hereunto signed my name to this specification.

HENRY H. SCHUETTE.